US012620113B2

(12) United States Patent (10) Patent No.: US 12,620,113 B2
Peruch et al. (45) Date of Patent: May 5, 2026

(54) OBJECT DIMENSIONING SYSTEM

(71) Applicant: QBOID, INC., San Jose, CA (US)

(72) Inventors: Francesco Peruch, Sunnyvale, CA (US); Tony Zuccarino, Scottsdale, AZ (US); Bin An, Saratoga, CA (US)

(73) Assignee: QBOID, INC., San Jose, CA (US)

( * ) Notice: Subject to any disclaimer, the term of this patent is extended or adjusted under 35 U.S.C. 154(b) by 392 days.

(21) Appl. No.: 18/124,785

(22) Filed: Mar. 22, 2023

(65) Prior Publication Data

US 2023/0306625 A1 Sep. 28, 2023

Related U.S. Application Data

(60) Provisional application No. 63/322,606, filed on Mar. 22, 2022.

(51) Int. Cl.
| | |
|---|---|
| *G06T 7/60* | (2017.01) |
| *G01B 11/02* | (2006.01) |
| *G06K 7/14* | (2006.01) |
| *G06T 7/194* | (2017.01) |
| *H04N 23/54* | (2023.01) |
| *H04N 23/61* | (2023.01) |

(52) U.S. Cl.
CPC .............. *G06T 7/60* (2013.01); *G01B 11/024* (2013.01); *G06K 7/1413* (2013.01); *G06T 7/194* (2017.01); *H04N 23/54* (2023.01); *H04N 23/61* (2023.01); *G06T 2207/10028* (2013.01)

(58) Field of Classification Search
CPC . G06T 7/60; G06T 7/194; G06T 2207/10028; G06T 7/11; G01B 11/024; G01B 11/00; G06K 7/1413; H04N 23/54; H04N 23/61; H04N 17/002; G01G 19/005; G01G 19/52
USPC ......................................................... 382/286
See application file for complete search history.

(56) References Cited

U.S. PATENT DOCUMENTS

| | | | | |
|---|---|---|---|---|
| 11,240,486 B1* | 2/2022 | Chen | ..................... | H04N 13/296 |
| 2006/0261157 A1* | 11/2006 | Ostrowski | ............ | G07G 1/0054 |
| | | | | 235/383 |
| 2008/0136957 A1* | 6/2008 | Yeh | ......................... | G03B 13/32 |
| | | | | 348/E5.045 |
| 2014/0021259 A1* | 1/2014 | Moed | .................... | G06K 7/1417 |
| | | | | 356/625 |
| 2014/0160239 A1* | 6/2014 | Tian | ........................ | H04N 19/82 |
| | | | | 348/43 |
| 2015/0036887 A1* | 2/2015 | Allezard | ................... | G06T 7/50 |
| | | | | 382/106 |

(Continued)

*Primary Examiner* — Stephen P Coleman
(74) *Attorney, Agent, or Firm* — WOMBLE BOND DICKINSON (US) LLP

(57) ABSTRACT

A dimensioning system includes: a depth camera system mounted above a working surface; and a computing device including a processor and memory, the memory storing instructions that, when executed by the processor, cause the processor to: detect a triggering condition when an object is placed on the working surface; control the depth camera system to capture a depth image of the object in response to the triggering condition; segment the object from a background depicted in the depth image to identify a portion of the depth image corresponding to a segmented object; and compute a plurality of dimensions of the object based on the portion of the depth image.

17 Claims, 5 Drawing Sheets

(56) References Cited

U.S. PATENT DOCUMENTS

| | | | |
|---|---|---|---|
| 2019/0213389 A1* | 7/2019 | Peruch | ....................... G06T 7/12 |
| 2022/0398780 A1* | 12/2022 | Pelc | ......................... G06T 7/85 |

* cited by examiner

DIM: 30"x15"x20"
WGT: 2.5 lbs
UPC: 0127421823

OBJECT DIMENSIONING SYSTEM

CROSS-REFERENCE TO RELATED APPLICATION(S)

This application claims the benefit of U.S. Provisional Patent Application No. 63/322,606, filed in the United States Patent and Trademark Office on Mar. 22, 2022, the entire disclosure of which is incorporated by reference herein.

FIELD

Aspects of embodiments of the present disclosure relate to systems and methods for automatically computing the weight and dimensions of objects.

BACKGROUND

The need for accurate dimensional information is critical for efficient operations in the sectors of retail supply chains (e.g., e-commerce), third party logistics (3PL), and warehousing.

For example, capturing accurate length, width, and height (L×W×H) item data for Master Data Catalogs, determining lowest cost packaging for shipping an order, or determining shipment size (e.g., weight and volume) to populate shipping manifests are all typical use cases in the field of logistics. However, object dimensioning is frequently a time consuming a tedious task and may involve performing manual measurements of objects, such as by visually comparing the object to rulers or tape measures or applying mechanical calipers to various surfaces of the object.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to an object dimensioning system configured to capture the dimensions of an object placed on a working surface.

According to one embodiment of the present disclosure, a dimensioning system includes: a depth camera system mounted above a working surface; and a computing device including a processor and memory, the memory storing instructions that, when executed by the processor, cause the processor to: detect a triggering condition when an object is placed on the working surface; control the depth camera system to capture a depth image of the object in response to the triggering condition; segment the object from a background depicted in the depth image to identify a portion of the depth image corresponding to a segmented object; and compute a plurality of dimensions of the object based on the portion of the depth image.

The memory may further store instructions that, when executed by the processor, cause the processor to transmit the plurality of dimensions of the object to a server computer.

The dimensioning system may further include: a scale mounted underneath the working surface, the memory may further store instructions that, when executed by the processor, cause the processor to record a weight of the object as measured by the scale.

The triggering condition may include detecting a weight on the scale greater than zero.

The dimensioning system may further include a barcode scanner connected to the computing device, the triggering condition may include scanning a barcode with the barcode scanner and decoding the barcode by the computing device.

The depth camera system may include a color camera, the working surface may have a solid pattern or color, and the instructions to segment the object from the background depicted in the depth image may include instructions to remove portions of the depth image having the solid pattern or color of the working surface.

The instructions to segment the object from the background depicted in the depth image may include instructions to identify portions of the depth image closer to the depth camera system than a plane of the working surface.

The memory may further store instructions to perform a calibration of the depth camera system by: capturing a calibration depth image of the working surface; and determining the plane of the working surface based on the calibration depth image.

The memory may further store instructions to periodically perform the calibration of the depth camera system.

The instructions to segment the object from the background depicted in the depth image may include instructions to disregard clusters of pixels of the depth image having a depth closer to the depth camera system than the plane of the working surface than extend to a boundary of a field of view of the depth camera system.

The instructions to compute the dimensions of the segmented object may include instructions to calculate a minimum bounding box that surrounds pixels of the portion of the depth image corresponding to the segmented object.

The memory may further store instructions to generate user feedback in response to computing the plurality of dimensions of the object.

The computing device of the dimensioning system may be detachable from the depth camera system, and the computing device may include an integrated second depth camera system.

According to one embodiment of the present disclosure, a method for computing dimensions of an object includes: detecting, by a computing device including a processor and memory, a triggering condition when an object is placed on a working surface; controlling, by the computing device, a depth camera system to capture a depth image of the object in response to the triggering condition; segmenting, by the computing device, the object from a background depicted in the depth image to identify a portion of the depth image corresponding to the segmented object; and computing, by the computing device, a plurality of dimensions of the object based on the portion of the depth image corresponding to the segmented object.

The method may further include transmitting the plurality of dimensions of the object to a server computer.

A scale may be mounted underneath the working surface, and the method map further includes recording a weight of the object as measured by the scale.

The triggering condition may include detecting a weight on the scale greater than zero.

The triggering condition may include detecting the scanning of a barcode with a barcode scanner and decoding the barcode by the computing device.

The method may further include performing a calibration of the depth camera system by: capturing a calibration depth image of the working surface without the object; and determining a plane of the working surface based on the calibration depth image.

The method may further include periodically performing the calibration of the depth camera system.

BRIEF DESCRIPTION OF THE DRAWINGS

The accompanying drawings, together with the specification, illustrate exemplary embodiments of the present invention, and, together with the description, serve to explain the principles of the present invention.

DESCRIPTION

In the following detailed description, only certain exemplary embodiments of the present invention are shown and described, by way of illustration. As those skilled in the art would recognize, the invention may be embodied in many different forms and should not be construed as being limited to the embodiments set forth herein.

Many industrial sectors and operations involve the management of physical objects of various sizes and weights. For example, retailers (e.g., e-commerce retailers) frequently manage inventories of products and may need to determine efficient techniques for storing and shipping these objects. As another example, third party logistics (3PL) entities may manage the warehousing, transportation, and delivery of objects (e.g., packages) having a variety of sizes and weights, and may need to calculate how best to allocate limited space and weight capacities of storage and cargo spaces.

However, when the objects to be managed are heterogenous—e.g., where the sizes and weights of the objects are not uniform—obtaining accurate dimensions and weights of the objects is important for planning, e.g., the usage of storage and cargo space. In addition, to accommodate a large volume of objects passing through a logistics or object management process, it is desirable for these object dimensioning and measurement systems to have high throughput, e.g., to perform the measurements on the objects in relatively short amounts of time.

Therefore, aspects of embodiments of the present disclosure relate to systems and methods for automatically computing the weight and dimensions of objects. In more detail, aspects of embodiments relate to a system that enables high speed dimensioning of objects and methods of operating the dimensioning system without requiring significant interaction from human operators.

Figure 1:
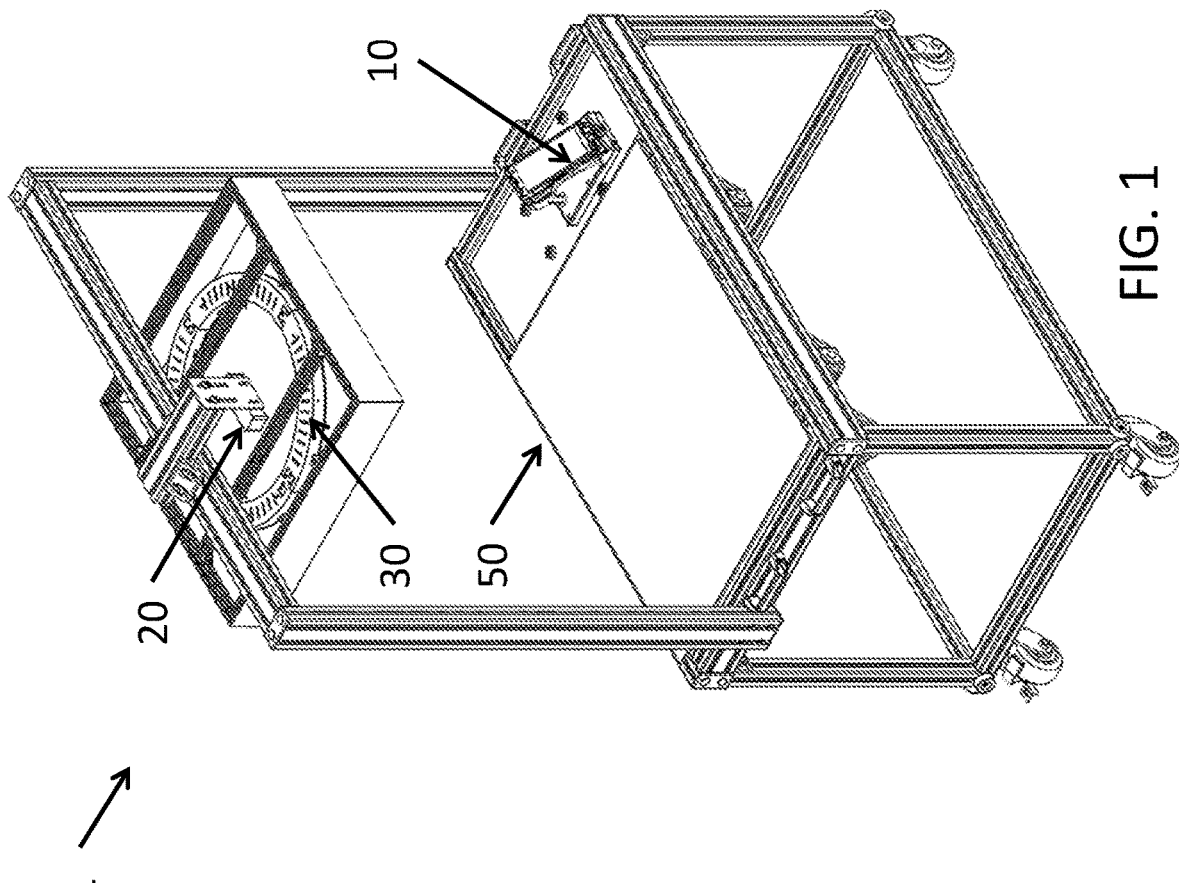
FIG. 1 is a perspective view of a dimensioning system according to one embodiment of the present disclosure.
Figure 2:
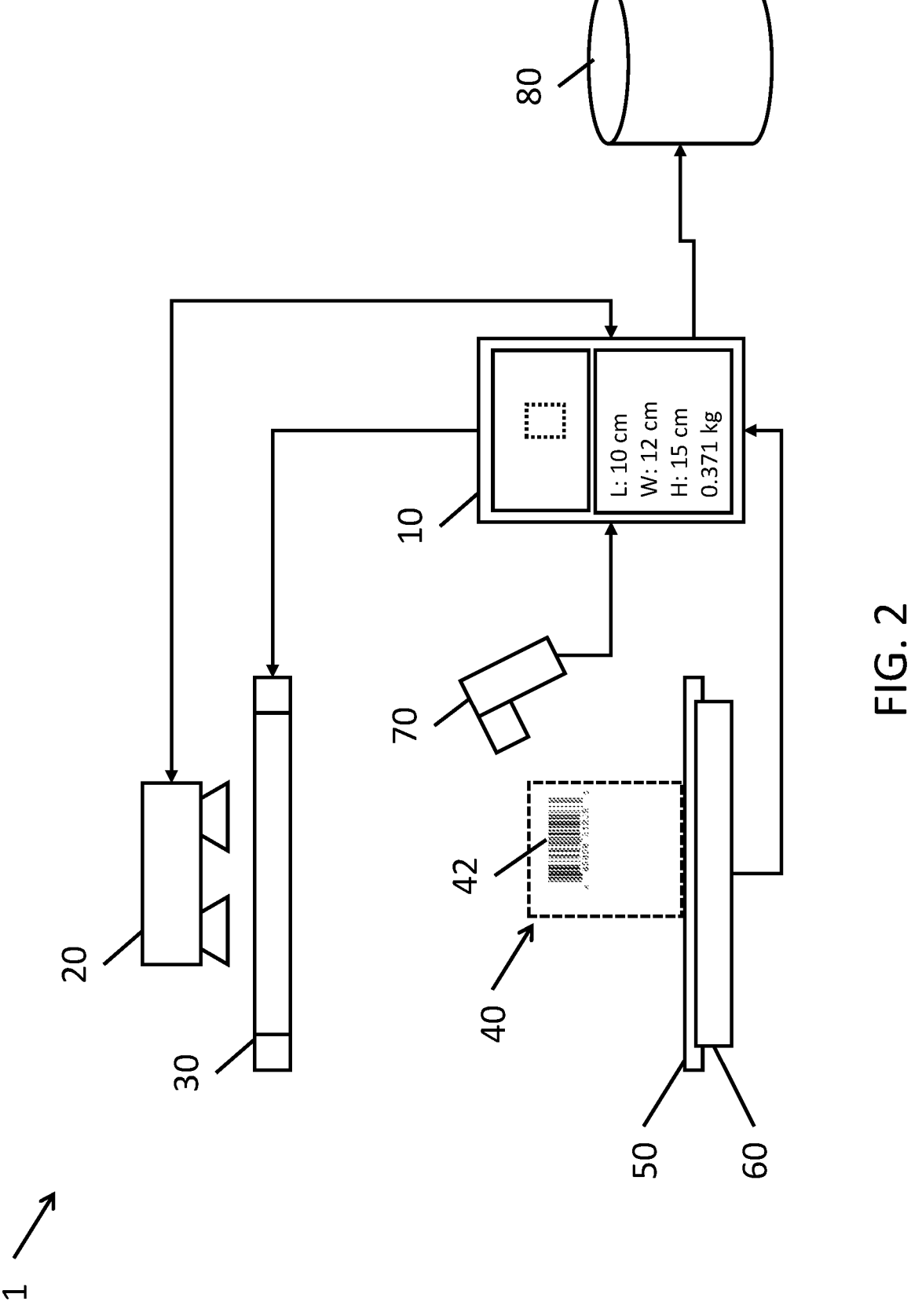
FIG. 2 is a side view of a dimensioning system according to one embodiment of the present disclosure.

FIG. 1 is a perspective view of a dimensioning system 1 according to one embodiment of the present disclosure. FIG. 2 is a side view of a dimensioning system 1 according to one embodiment of the present disclosure. As shown in FIG. 1 and FIG. 2, the dimensioning system 1 includes a controller or computing device 10. The computing device 10 includes a processing circuit and memory, where the memory stores instructions that cause the processor to perform various operations in accordance with embodiments of the present disclosure, as described in more detail below. Examples of processing circuits (or processors) include, but are not limited to, a microcontroller, system-on-chip (SoC), a graphics processing unit (GPU), an application specific integrated circuit (ASIC), a field programmable gate array (FPGA), and the like.

The computing device 10 is configured to control a depth camera system 20 or depth reconstruction system. Examples of depth camera systems 20 include, but are not limited to, stereo camera systems, structured light depth camera systems, time of flight (ToF) depth camera systems, and the like. In some embodiments, the computing device 10 is also configured to control a lighting system 30 (or illumination system). The lighting system 30 is configured to emit light onto a scene containing an object 40 to be dimensioned based on images captured by the depth camera system 20. During a dimensioning process, the object 40 to be dimensioned is placed or located on a working surface 50. In the example shown in FIG. 1, the lighting system 30 is depicted as a ring light (e.g., a linear array of light emitting devices such as light emitting diodes arranged in a closed loop), where the depth camera system 20 is configured to capture depth images through the ring light (e.g., through the loop). However, embodiments of the present disclosure are not limited thereto.

In some embodiments, the working surface 50 forms a weighing pan of a scale or balance 60 (also known as a mass scale, weight scale, mass balance, or weight balance), such as a spring balance using a strain gauge or other transducer to convert the deformation of the string into an electronically detectable signal.

In some embodiments, the dimensioning system 1 further includes a barcode scanner 70 connected to the computing device 10, which may be used to scan or read a barcode 42. In some embodiments, the barcode scanner is integrated into the depth camera system 20. For example, the depth camera system 20 may include a color camera or a monochrome camera that captures an image of the surface, where the computing device 10 processes the image to extract the information stored in the barcode depicted in the image.

Figure 3:
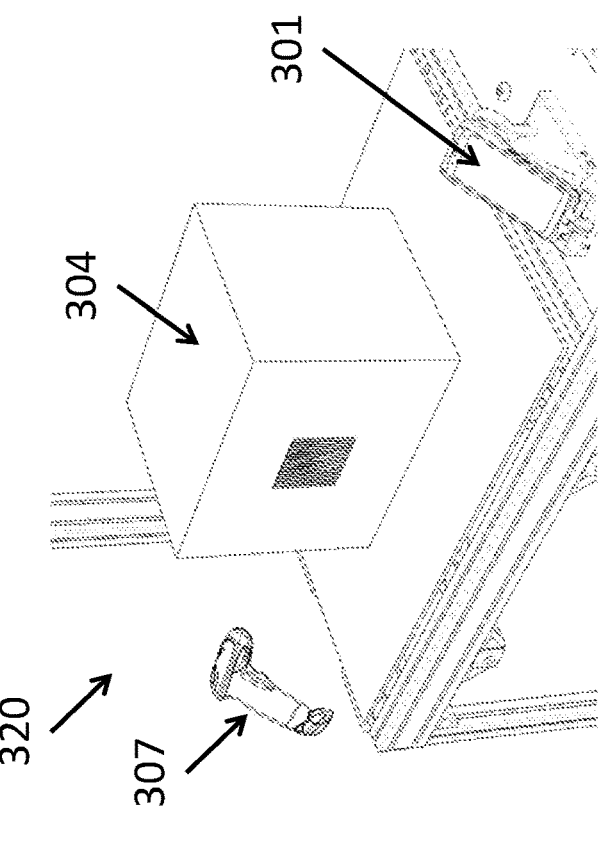
FIG. 3 is a flowchart depicting steps followed by an operator in one embodiment of the present disclosure.
Figure 3:
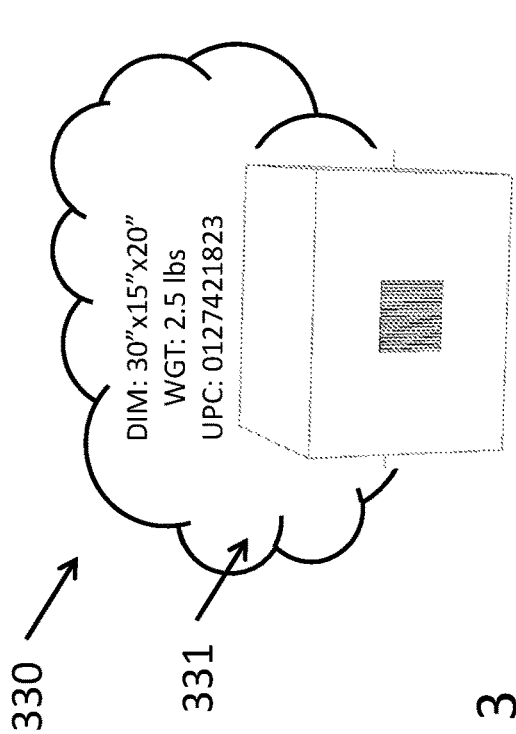
Figure 3:
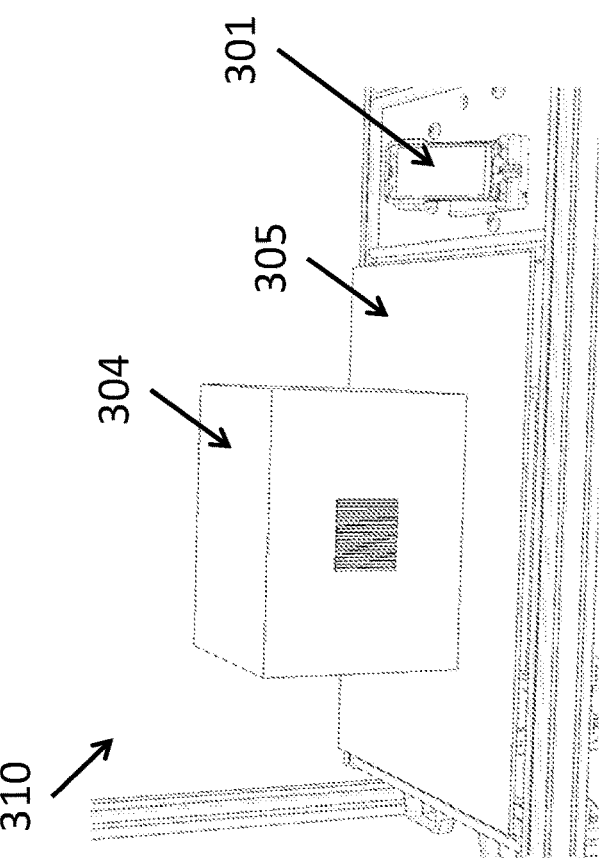

FIG. 3 is a flowchart depicting the usage of a scanning system according to one embodiment of the present disclosure by an operator.

In some embodiments of the present disclosure, during operation, at 310, an operator positions an item to be measured (e.g., an object 304) onto a working surface 305 and, at 320, triggers the start of a dimensioning cycle (e.g., by scanning a barcode on the object using a barcode scanner 307). During a dimensioning cycle, the depth camera system 20 captures one or more depth images (e.g., a depth map) of the scene, including the object 40 and supplies the depth image (or depth images) to a computing device 301 to compute dimensions of the object 304. For example, in some embodiments, the depth camera system (e.g., depth camera system 20) includes local processing capabilities (e.g., a processing circuit which may include a central processing unit, a graphics processing unit, a neural accelerator, or the like) and is configured to process raw data captured by imaging sensors of the depth camera system 20 prior to transmitting processed data to the computing device, where the processed data may include, for example, computed depth images. In some embodiments, the depth camera system captures raw data and provides the raw data to the computing device, where the computing device generates a depth image based on the raw data. (For example, in the case of a stereo depth camera system, the depth camera system may capture a stereo pair of images and the computing device may generate a depth map based on disparity.) In embodiments that include a scale (e.g., scale 60), the mass (or weight) of the object is also captured and provided to the computing device.

The resulting dimensions may be displayed on a display device (e.g., a touchscreen) of the computing device 10 for the operator to verify. For example, in some embodiments, the display device shows an image of the scene as visible to the depth camera system 20 and depicts a bounding box depicting the estimated bounding box around the object, along with the dimensions (e.g., length, width, and height) and mass or weight as captured by the system. The operator may use the displayed information to confirm that dimensioning results are reasonable. The bounding box of an object 40 may be, for example, a cuboid or right rectangular prism that encloses the entire object 40, where the bounding box may have a substantially minimum size (e.g., the smallest volume that will encompass the entire object 40).

In some embodiments, the computing device 10 provides user feedback to the operator once the measurement process is complete. In some embodiments, the user feedback relates to audio confirmation that the measurements of the object were captured successfully (e.g., an "OK" sound) or providing feedback that an error occurred (e.g., a "failure" sound). A failure may occur, for example, in a case where the object is partially outside of the field of view of the depth camera system 20, where there may be multiple objects that affect the measurements (e.g., operator hands resting on the working surface and therefore increasing the measured weight or being included in the captured dimensions), or the like.

In some embodiments, when the scanning succeeds and the operator removes the object 40 from the working surface 50 at 330, the measurements regarding the object (e.g., including the reading from the barcode, if applicable) may be stored locally on the computing device 10 and/or, in some embodiments, may also be transmitted to a server computer 80 (e.g., to be written to a database connected over a network 331, such as running in a cloud computing environment). The computing device 10 may communicate with the server 80 over a computer network (e.g., Wi-Fi, Ethernet, cellular data, the Internet, and combinations thereof).

In some embodiments, the computing device 10 automatically resets the workflow such that the dimensioning system 1 is ready for the next object after detecting that the operator has removed the item or object 40 from working surface 50. For example, the computing device 10 may detect that there are no objects in the field of view of the depth camera system 20 (apart from the working surface 50) or may detect that the scale 60 measures a weight of zero (e.g., based on calibration with an empty working surface 50) and, in response to detecting this condition, resets the workflow. In some embodiments, this includes re-zeroing (or taring) the scale 60 and entering an operating state where detecting the placement of an object on the working surface 50 will trigger the measurement of the object.

Accordingly, in some embodiments, during normal operation, the operator does not need to interact with any user interfaces (e.g., touchscreen user interfaces) of the computing device 10 and, instead, can dimension items by placing them on the working surface 50 and removing them from the working surface. In some embodiments, the computing device 10 provides an interface for an operator to manually insert additional special notes or to add metadata to the measurements performed on the object 40.

Figure 4:
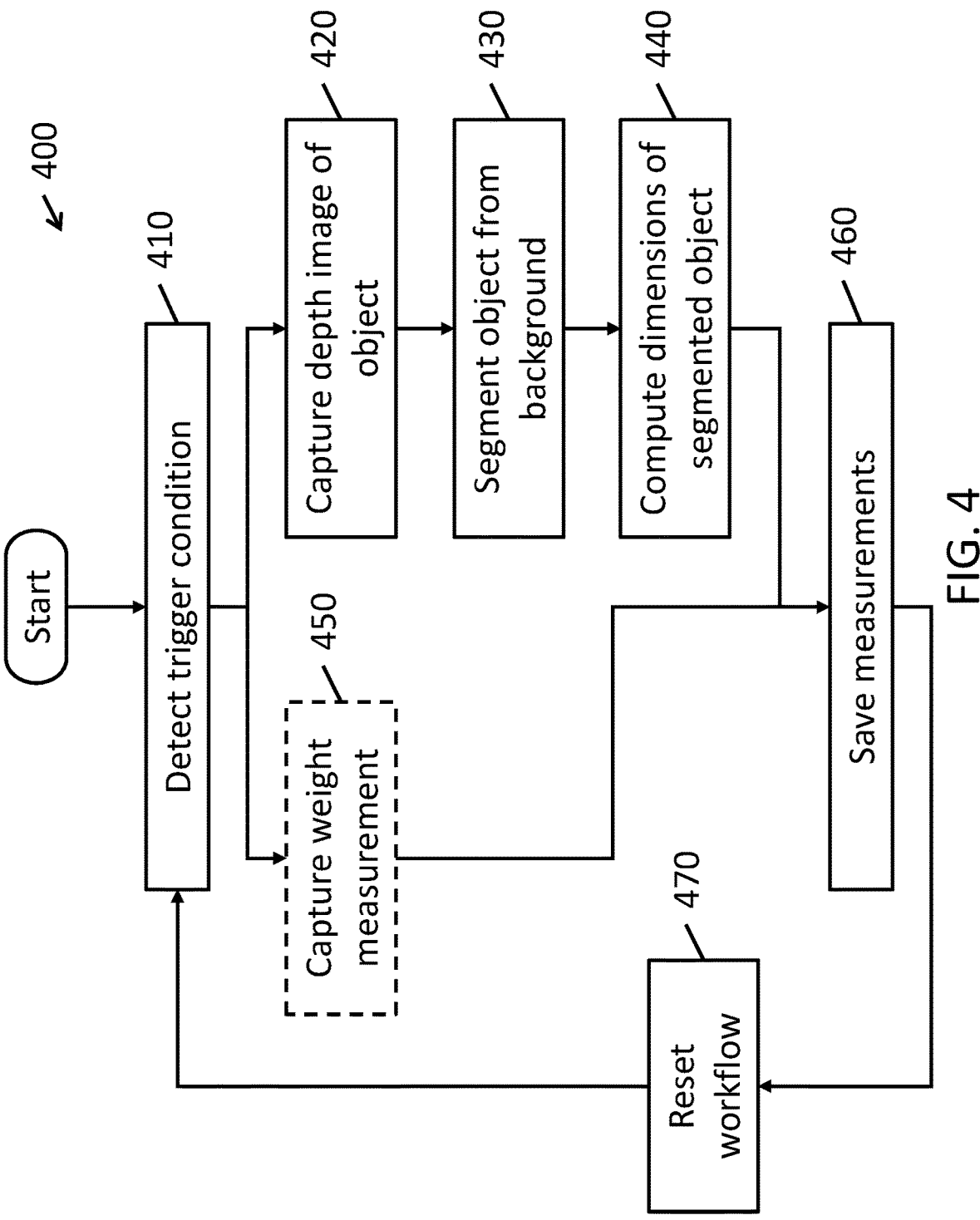
FIG. 4 is a flowchart depicting operations performed by the computing device according to one embodiment of the present disclosure.

FIG. 4 is a flowchart depicting operations performed by the computing device 10 according to one embodiment of the present disclosure.

Referring to FIG. 4, a method 400 for managing an object dimensioning process according to one embodiment of the present disclosure is controlled by the computing device 10 and is implemented in instructions stored in the memory of the computing device 10 and executed by the processing circuit (or processor) of the computing device 10.

At operation 410, the computing device 10 detects a trigger condition to start a cycle. In some embodiments, the triggering condition is the scanning of a barcode on the object, such as by the barcode scanner 70. In some embodiments, the trigger condition is detecting a barcode on a top surface of the object using images captured the depth camera system 20 or one or more supplemental cameras (e.g., color cameras or monochrome cameras) configured to image objects placed on the working surface 50. The supplemental cameras may be arranged overhead (e.g., along a similar optical axis as the depth camera system 20) and/or may also be arranged to image side surfaces of the object (e.g., placed at lower angles with respect to the object). In some embodiments, the trigger condition is detecting that the weight measured by the scale is greater than zero and has remained constant for at least a threshold amount of time (e.g., 500 milliseconds or 1 second). In some embodiments, the trigger condition is detecting, e.g., using the depth camera system 20, that there is only a single object on the working surface 50 (e.g., there are no operator hands or robot arms in the scene). In some embodiments, multiple conditions must be satisfied (e.g., weight greater than zero and barcode is scanned) in order for the trigger condition to be met. While the above provide some examples of trigger conditions, embodiments of the present disclosure are not limited thereto. In some embodiments, the dimensioning system 1 includes a separate object detector that generates an output that is used as a triggering condition. In some such embodiments, the object detector is implemented using a photocell or laser curtain (e.g., to detect the presence of an object based on the blocking of one or more light beams).

In response to detecting the trigger condition has been met at operation 410, the computing device 10, at operation 420, captures one or more depth images of the object. In particular, the depth camera system 20 captures one or more depth images of a scene within its field of view, which includes the working surface 50 and any items placed thereon. In some embodiments, the computing device 10 controls the depth camera system 20 to capture a depth image of the object (or raw data to be used to compute a depth image of the object) in response to detecting that the trigger condition has been met. In some embodiments, the depth camera system 20 continuously captures depth images (e.g., at a frame rate, such as 24 frames per second) and the computing device 10 may use one or more depth images that were captured by the depth camera system 20, e.g., including depth images captured before, after, or both before and after detecting the trigger condition is met.

In some embodiments, the dimensioning system 1 includes a lighting system 30. Accordingly, the computing device 10 may further control the lighting system 30 to illuminate the scene (e.g., to illuminate the object 40 and the working surface 50) during the capture of the one or more depth images by the depth camera system. In some embodiments, the lighting system 30 provides illumination in a portion of the electromagnetic spectrum detectable by the depth camera system 20 (e.g., visible light in the case of a visible light depth camera system or infrared light in the case of an infrared light depth camera system). In some embodiments, the lighting system 30 provides standard illumination (e.g., flash fill lighting or continuous lighting). In some embodiments, the lighting system 30 provides specialized lighting particular to the depth camera system 20. For example, as noted above, in some embodiments the depth camera system 20 is a structured light depth camera system and the lighting system 30 projects structured light onto the scene. In some embodiments, the lighting system 30 projects a pattern or texture onto the scene in order to provide additional features for a stereo depth camera system to detect to perform block matching for calculating a disparity map (and for computing a depth map from the disparity map). In some embodiments, the lighting system 30 projects light for a time of flight depth camera system.

While the lighting system 30 is depicted as a ring in FIG. 1 and in FIG. 2 where the axis of the depth camera system 20 is aligned with axis through the center of the ring, embodiments of the present disclosure are not limited thereto. For example, the lighting system 30 may have different shapes may be arranged in different locations with respect to the depth camera system 20 in order to provide illumination to the scene.

In some embodiments, the lighting system 30 includes a plurality of individually-controllable or individually addressable light emitting elements, such as a plurality of separately controllable lighting panels or an array individual light emitting diodes. For example, an array of individually addressable light emitting diodes may be arranged in the ring shown in FIG. 1 and FIG. 2. In addition, in some embodiments the lighting system 30 is configured to emit light in a plurality of different wavelengths (e.g., separately addressable red, green, and blue wavelengths in an RGB panel). Accordingly, in some embodiments of the present disclosure, the computing device 10 controls different portions of the lighting system 30 to emit light while capturing different depth images of the scene using the depth camera system 20. By capturing multiple depth images with different illumination and combining the multiple different depth images, the computing device 10 can resolve ambiguities in the scene (e.g., caused by reflections or other visual artifacts that may be apparent when the object is lit from some angles but not from other angles).

In some embodiments, at operation 430 the computing device 10 segments the object from the background. Segmenting the object from the background removes other surfaces that may be visible in the depth image captured by the depth camera system 20. These other surfaces may include, for example, the working surface 50, the hands of the operator, robot arms, a barcode scanner, other machinery, other items, or the like. Segmenting the object from the other surfaces in the scene increases accuracy of the dimensioning of the object of interest by excluding the dimensions of other objects that are within the field of view of the depth camera system 20.

In some embodiments, the segmentation is performed by selecting all pixels having a depth that is closer than the plane of the working surface 50 (e.g., where the plane of the working surface 50 may be known from calibration). In some embodiments, the plane of the working surface 50 is periodically measured between scans (e.g., when no object is present on the working surface 50) such that the dimensioning system can perform self-recalibrations (e.g., due to movement of the depth camera system 20 with respect to the working surface 50). In some embodiments, the segmentation is performed using an instance segmentation algorithm, such as a convolutional neural network that is trained to perform instance segmentation (e.g., separating individual objects in a scene based on appearance). In some embodiments of the present disclosure, the working surface 50 has a distinctive pattern or color (e.g., solid blue or solid green) to improve the ability of the computing device 10 to segment the object 40 from the working surface 50 in the images captured by the depth camera system 20. For example, all pixels in the depth image matching the distinctive color or classified as being part of the distinctive pattern may be ignored and the remaining pixels may be treated as being part of the object. In addition, in some embodiments, the computing device 10 segments the object from extraneous surfaces (such as operator hands and robot arms and other objects that are awaiting dimensioning or where dimensioning has been completed) by disregarding clusters of pixels with a depth closer than the working surface 50 that extend to the boundary of the field of view of the depth camera system 20 (e.g., an operator's arms will extend past the field of view of the depth camera system 20, and therefore will extend to the boundary of the depth images and thus will be removed).

In operation 440, the computing device 10 computes the dimensions of the segmented object 40, such as by calculating a minimum bounding box that surrounds the depth pixels corresponding to the segmented object. For example, in some embodiments, the segmented depth pixels are projected into a point cloud representation (e.g., a collection of three-dimensional coordinates representing locations on the detected surface of the object), and the bounding box is computed based on the finding a box that contains all of the points of the point cloud. A minimum bounding box for a point cloud has a smallest volume among possible bounding boxes that contain all of the points of the point cloud. In some embodiments, the minimum bounding box is subject to some constraints, such as requiring that the bounding box has a bottom surface that is along the plane of the working surface 50, a top surface that is parallel to the working surface 50, and side surfaces that are perpendicular to the working surface 50. In some embodiments, the minimum bounding box is computed without regard to the direction of the working surface 50 (e.g., without requiring that a surface of the bounding box is parallel to the working surface 50), such as where additional depth reconstruction systems are included in the dimensioning system 1 to capture images of the object from other directions (e.g., portions that are self-occluded by the object, such as areas near the working surface 50).

As noted above, in some embodiments, a digital scale 60 is located underneath the working surface 50 such that, at 450, the digital scale 60 measures the weight (mass) of the object 40 placed on the working surface 50.

In addition, as noted above, in some embodiments, the computing device 10 is connected to a barcode scanner 70 which is configured to scan a barcode 42 affixed to a surface of the object 40. The barcode may be, for example, a 1D (or linear) barcode or a 2D (or matrix) barcode such as a QR code. In some embodiments, the dimensioning system 1 includes a near field communications (NFC) reader, such as a radio-frequency identification (RFID) reader to read an electronic tag (e.g., an RFID tag) attached to the object 40 or integrated with the object.

At operation 460, the computing device 10 collects the measurements captured by various sensors of the dimensioning system 1, such as the dimensions computed from the one or more depth images captured by the depth camera system, the weight measurement captured by the digital scale 60 (if present), the barcode information read by the barcode scanner 70 (if present) or by one or more cameras capturing an image of a barcode on the object 40, electronic tag information (if present), and the like. As noted above, in some embodiments, the measurements are displayed on a display device (e.g., touchscreen) of the computing device 10 for the operator to review, and the computing device 10 may provide user feedback (e.g., audio and/or visual user feedback) that the scan is complete. For example, the computing device 10 may generate user feedback by playing a tone indicating success versus failure and/or by changing the lighting emitted by the lighting system 30 to be green to indicate success or red to indicate failure (or using a separate indicator light to provide visual user feedback). In some embodiments, the visual feedback is provided on the display device of the computing device 10. In some embodiments, in the case of detecting a failure, the display device may also show a reason for the failure (e.g., multiple objects detected or object of interest extends outside of the field of view of the depth camera system 20).

As noted above, in some embodiments, the computing device 10 uploads the measurements to a server 80 after a successful dimensioning cycle when it detects that the object 40 has been removed from the working surface 50 (e.g., using depth images provided by the depth camera system 20 and/or using weight measurements from the scale 60). The measurements may be stored and uploaded in a data interchange format such as JavaScript Object Notation (JSON) or Extensible Markup Language (XML). In some embodiments, the barcode information is used to lookup a record in a database (e.g., the database 80), where the measurements are used to update the existing record (e.g., add measurements where none are present) or to verify measurements (e.g., confirm that the measurements match the measurements stored in the database).

After saving the measurements at operation 460, the computing device 10 automatically resets the workflow at operation 470 to await a next triggering condition at 410 corresponding to the placement of another object on the working surface 50.

In some embodiments a dimensioning system 1 is capable of measuring the weight of an item, scanning an item, and computing its dimensions to provide measurements on the screen within 0.25 seconds of the triggering event (e.g., a barcode scan).

In some embodiments, the computing device 10 is a handheld computing device (e.g., approximately the size of a smartphone or table and capable of being held comfortably in a human hand for an extended period of time). In these embodiments, the computing device 10 may further include one or more integrated depth sensors and, in some embodiments, a barcode scanner and/or an NFC reader. For example, in some embodiments, the barcode scanner 70 and/or an NFC reader is integrated into the computing device 10. In some embodiments, the handheld computing device is used to scan objects that are too large to fit on the working surface 50. For example, in some embodiments the computing device 10 is detachable from the dimensioning system and an integrated depth sensor may be used to capture depth images of objects while detached from the dimensioning system (e.g., while removed from a cradle of the dimensioning system 1, as shown in FIG. 1). In various embodiments, the computing device 10 communicates with other components of the dimensioning system 1 (e.g., the depth camera system 20 and a scale 60 of the dimensioning system 1) over a wired connection (e.g., Universal Serial Bus or USB) or over a wireless connection (e.g., Bluetooth®, Wi-Fi, Zigbee, and the like). Accordingly, the same processing hardware (e.g., processor and memory of the computing device 10) may be used to control the depth camera system 20 of the dimensioning system 1 and compute dimensions of objects placed on the working surface 50 when the computing device 10 is connected to the dimensioning system 1 while also enabling the flexibility to scan objects that do not fit on the working surface 50 by using the integrated depth sensor instead.

Figure 5:
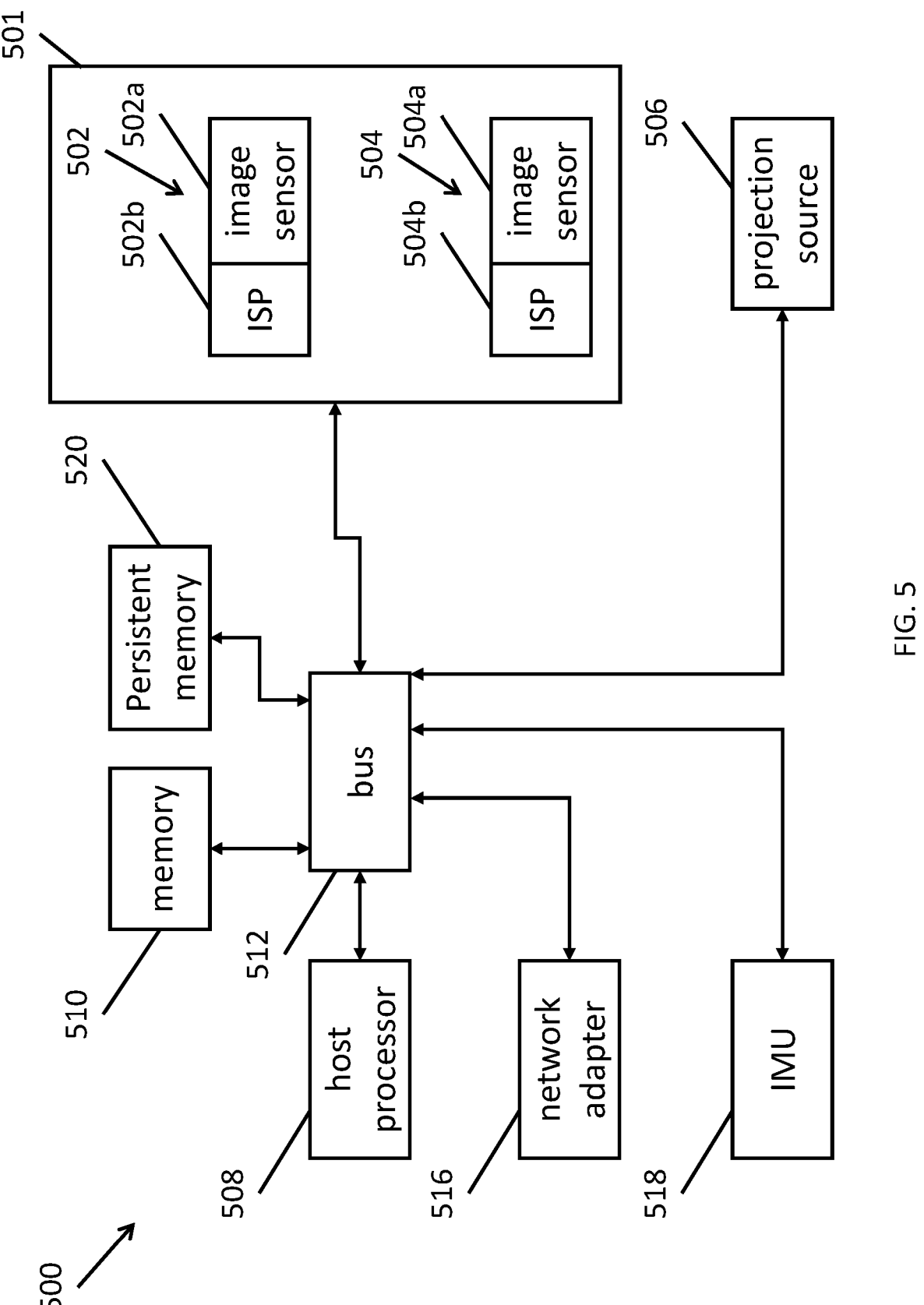
FIG. 5 is a block diagram of a computing device connected to a depth camera system according to one embodiment of the present invention.

FIG. 5 is a block diagram of a computing device 500 according to one embodiment of the present invention. The computing device 500 shown in FIG. 5 is connected to a depth camera system 501 over a bus 512. The depth camera system 501 may include the depth camera system 20 shown in FIG. 1 or may include an integrated depth camera system (e.g., integrated into a same housing as the processor and memory of the computing device 500). As noted above, in various embodiments, the depth camera system 501 may be implemented using a stereo depth camera system, a structured light depth camera, a time-of-flight (ToF) depth camera, and the like. In the example shown in FIG. 5, the depth camera system 501 is shown as a stereo depth camera system that includes a first camera 502 and a second camera 504. In addition, the computing device 500 is connected to a projection source 506 (or illumination source or active projection system which may include the lighting system 30), and a host processor 508 and memory 510, wherein the host processor 508 may be, for example, a graphics processing unit (GPU), a general purpose central processing unit (CPU), an appropriately configured field programmable gate array (FPGA), an application specific integrated circuit (ASIC), or the like, or combinations thereof. The first camera 502 and the second camera 504 may be rigidly attached, e.g., on a frame, such that their relative positions and orientations are substantially fixed. The first camera 502 and the second camera 504 include corresponding image sensors 502a and 504a and may also include corresponding image signal processors (ISP) 502b and 504b. The various components may communicate with one another over a system bus 512 (the system bus 512 may connect to components that are internal to the computing device, such as between the host processor 508 and the memory 510 as well as to components that are external to the computing device, such as being connected to an external peripheral such as the depth camera system 20 shown in FIG. 1). The computing device 500 may include additional components such as a network adapter 516 to communicate with other devices, an inertial measurement unit (IMU) 518 such as a gyroscope to detect acceleration of the computing device 500 (e.g., detecting the direction of gravity to determine orientation), and persistent memory 520 such as NAND flash memory for storing data collected and processed by the computing device 500. The IMU 518 may be of the type commonly found in many modern smartphones. The image capture system may also include other communication components, such as a universal serial bus (USB) interface controller.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

For example, while FIG. 1 depicts an embodiment where the dimensioning system 1 is attached to a rolling cart, the present disclosure is not limited thereto. In some embodiments, the dimensioning system 1 is attached, for example, to a countertop (e.g., in a warehouse or in a retail store). In some embodiments, the dimensioning system 1 is mounted on a vehicle such as a truck, a railroad car (e.g., a freight car or boxcar), a shipping container, a plane, or watercraft (e.g., a boat or a ship), such as for handling logistics associated with goods transported by such vehicles.

As another example, in some embodiments the dimensioning system is integrated with a conveyor system such that, for example, the conveyor system conveys objects through the field of view of the depth camera system 20. For example, the working surface 50 may be implemented as a conveyor belt (which in some embodiments includes an integrated scale). In some embodiment, objects are transferred between an external conveyor system to the conveyor belt of the dimensioning system. In some embodiments, the conveyor system (e.g., a conveyor belt or an overhead conveyor) is separate from the dimensioning system and conveys the object past the depth camera system 20 (e.g., beneath the depth camera system 20 in the case of a conveyor belt).

What is claimed is:

1. A dimensioning system comprising:
a depth camera system mounted above a working surface; and
a computing device comprising a processor and memory, the memory storing instructions that, when executed by the processor, cause the processor to:
detect a triggering condition when an object is placed on the working surface;
control the depth camera system to capture a depth image of the object in response to the triggering condition;
segment the object from a background depicted in the depth image to identify a portion of the depth image corresponding to a segmented object;
compute a plurality of dimensions of the object based on the portion of the depth image; and
perform a calibration of the depth camera system by:
capturing a calibration depth image of the working surface; and
determining the plane of the working surface based on the calibration depth image,
wherein the memory further stores instructions that, when executed by the processor, cause the processor to periodically perform self-recalibration of the depth camera system between scans when no object is present on the working surface.

2. The dimensioning system of claim 1, wherein the memory further stores instructions that, when executed by the processor, cause the processor to transmit the plurality of dimensions of the object to a server computer.

3. The dimensioning system of claim 1, further comprising:
a scale mounted underneath the working surface,
wherein the memory further stores instructions that, when executed by the processor, cause the processor to record a weight of the object as measured by the scale.

4. The dimensioning system of claim 3, wherein the triggering condition comprises detecting a weight on the scale greater than zero.

5. The dimensioning system of claim 1, further comprising a barcode scanner connected to the computing device,
wherein the triggering condition comprises scanning a barcode with the barcode scanner and decoding the barcode by the computing device.

6. The dimensioning system of claim 1, wherein the depth camera system comprises a color camera, wherein the working surface has a solid pattern or color, and
wherein the instructions to segment the object from the background depicted in the depth image comprise instructions to remove portions of the depth image having the solid pattern or color of the working surface.

7. The dimensioning system of claim 1, wherein the instructions to segment the object from the background depicted in the depth image comprise instructions to identify portions of the depth image closer to the depth camera system than a plane of the working surface.

8. The dimensioning system of claim 1, wherein the memory further stores instructions to periodically perform the calibration of the depth camera system.

9. The dimensioning system of claim 7, wherein the instructions to segment the object from the background depicted in the depth image comprise instructions to disregard clusters of pixels of the depth image having a depth closer to the depth camera system than the plane of the working surface than extend to a boundary of a field of view of the depth camera system.

10. The dimensioning system of claim 1, wherein the instructions to compute the dimensions of the segmented object comprise instructions to calculate a minimum bounding box that surrounds pixels of the portion of the depth image corresponding to the segmented object.

11. The dimensioning system of claim 10, wherein the memory further stores instructions to:
generate user feedback in response to computing the plurality of dimensions of the object.

12. The dimensioning system of claim 1, wherein the computing device of the dimensioning system is detachable from the depth camera system, and
wherein the computing device comprises an integrated second depth camera system.

13. A method for computing dimensions of an object, the method comprising:
detecting, by a computing device comprising a processor and memory, a triggering condition when an object is placed on a working surface;
controlling, by the computing device, a depth camera system to capture a depth image of the object in response to the triggering condition;
segmenting, by the computing device, the object from a background depicted in the depth image to identify a portion of the depth image corresponding to the segmented object;
computing, by the computing device, a plurality of dimensions of the object based on the portion of the depth image corresponding to the segmented object; and
performing a calibration of the depth camera system by:
capturing a calibration depth image of the working surface without the object; and
determining a plane of the working surface based on the calibration depth image,
wherein the method further comprises self-recalibration by periodically performing the calibration of the depth camera system, and
wherein the calibration of the depth camera system is performed between scans when no object is present on the working surface.

14. The method of claim 13, further comprising transmitting the plurality of dimensions of the object to a server computer.

15. The method of claim 13, wherein a scale is mounted underneath the working surface, and wherein the method further comprises recording a weight of the object as measured by the scale.

16. The method of claim 15, wherein the triggering condition comprises detecting a weight on the scale greater than zero.

17. The method of claim 13, wherein the triggering condition comprises detecting scanning of a barcode with a barcode scanner and decoding the barcode by the computing device.

\* \* \* \* \*